United States Patent [19]

Brown et al.

[11] Patent Number: 5,124,484

[45] Date of Patent: Jun. 23, 1992

[54] PROCESS FOR THE PREPARATION OF POLYISOBUTENE AMINES AND FUEL COMPOSITIONS COMPRISING SAID POLYISOBUTENE AMINES

[75] Inventors: Simon C. Brown; Michael J. Clarke, both of Hull, England

[73] Assignee: BP Chemicals (Additives) Limited, London, England

[21] Appl. No.: 798,268

[22] Filed: Nov. 19, 1991

Related U.S. Application Data

[63] Continuation of Ser. No. 474,380, Feb. 1, 1990, abandoned.

[30] Foreign Application Priority Data

Feb. 10, 1989 [GB] United Kingdom ............ 8902987

[51] Int. Cl.⁵ .................................. C07C 209/26
[52] U.S. Cl. ............................ 564/472; 564/279; 564/489
[58] Field of Search ................. 564/279, 472, 489

[56] References Cited

U.S. PATENT DOCUMENTS

| | | | |
|---|---|---|---|
| 3,565,954 | 2/1971 | Bouniot | 564/472 X |
| 3,821,302 | 6/1974 | Hu | 564/279 |
| 4,927,912 | 5/1990 | Speranza et al. | 564/472 X |

FOREIGN PATENT DOCUMENTS

| | | |
|---|---|---|
| 1547 | 5/1979 | European Pat. Off. |
| 238001 | 9/1987 | European Pat. Off. |
| 2416940 | 9/1979 | France |
| 497726 | 3/1937 | United Kingdom |

Primary Examiner—Richard L. Raymond

Attorney, Agent, or Firm—Brooks Haidt Haffner & Delahunty

[57] ABSTRACT

A process for the preparation of a polyisobutene amine, in particularly a polyisobutene amine of formula (I):

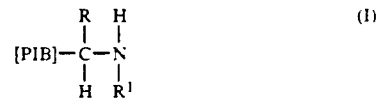

comprises reacting a carbonyl funtionalized polyisobutene [PIB]—(CO)R and an amine $H_2NR^1$ and hydrogenating the product of the reaction between said carbonyll functionalized polyisobutene and said amine, where PIB is a polyisobutenyl group, R = H, methyl or vinyl,
$R^1 = C_1-C_{20}$ alkyl group or $-(CHR^2)_n[X(CH_2)_m]_pX^1R^3$
$R^2$ = H or methyl
n = an integer of 1–4
m = an integer of 2–4
p = 0, or an integer of 1–10
$R^3$ = H or $C_1-C_{10}$ alkyl
X, $X^1$ = O or $NR^4$
$R^4$ = H, $C_1-C_{10}$ alkyl group, or $[(CH_2)_qX^2R^5]$
q = an integer of 2–4
$R^5$ is H, $C_1-C_{10}$ alkyl group
$X^2$ is O or NH each of X and $X^1$ may be the same or may be different and when p>1 each of the repeating units $[X(CH_2)_m]$ may be the same or may be different.

Polyamines or alcoholamines are preferred amines. The hydrogenation of the intermediate product is preferably effected by formic acid. The process of the invention is preferably carried out in one step.

9 Claims, No Drawings

PROCESS FOR THE PREPARATION OF POLYISOBUTENE AMINES AND FUEL COMPOSITIONS COMPRISING SAID POLYISOBUTENE AMINES

This application is a continuation of application Ser. No. 07/474,380, filed Feb. 1, 1990, now abandoned.

This invention relates to polyisobutene amines and fuel compositions comprising said polyisobutene amines.

The oxidation of polyisobutenes to produce functionalised polyisobutenes by contact with a molecular oxygen-containing gas or other oxidant in the presence or absence of catalysts is well-known in the art. Oxidised polyisobutenes produced thereby are potentially valuable industrial products because they are readily convertible by further reaction, for example with amines, into materials which can be used as lubricating oil and gasoline additives.

The oxidation and subsequent reaction of polyisobutenes with amines is described in, for example, U.S. Pat. No. 3,821,302. This patent discloses that a dispersant for a lubricating oil or a fuel can be prepared by the non-catalysed air-oxidation of a polyolefin or of a halogenated polyolefin to form an oxygen-containing material. This material is then reacted with an aliphatic polyamine under conditions that cause the formation of an imine product.

Oxidation of polyisobutenes can produce several functional substituents, including carbonyl (e.g. ketonic and aldehydic) groups and carboxylic acid groups. It is with carbonyl functionalised polyisobutenes that the present invention is concerned. Direct reaction of such carbonyl functionalised polyisobutenes with amines in our experience produces a gasoline detergent (an imine), which is hydrolytically and thermally unstable. Clearly, this is a problem, since gasolines generally contain some water. One method of solving the hydrolytic instability problem is to use formaldehyde to link the amine to the carbonyl groups via the Mannich reaction. We have found that the Mannich reaction produces a product containing undesirable resins.

We have now unexpectedly found that hydrogenation of the imine formed by the reaction of a carbonyl functionalised polyisobutene and an amine to give a polyisobutene amine results in a gasoline additive of improved hydrolytic stability.

According to the present invention there is provided a process for the preparation of a polyisobutene amine comprising reacting a carbonyl functionalised polyisobutene and an amine and hydrogenating the product of the reaction between said carbonyl functionalised polyisobutene and said amine.

According to the present invention there is provided a process for the preparation of a polyisobutene amine of formula (I):

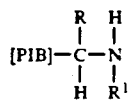
(I)

comprising reacting a carbonyl functionalised polyisobutene [PIB]—(CO)R and an amine $H_2NR^1$ and hydrogenating the product of the reaction between said carbonyl functionalised polyisobutene and said amine, where PIB is a polyisobutenyl group.

R = H, methyl or vinyl,
$R^1 = C_1-C_{20}$ alkyl group or $-(CHR^2)_n[X(CH_2)_m]_pX^1R^3$
$R^2$ = H or methyl
n = an integer of 1-4
m = an integer of 2-4
p = 0, or an integer of 1-10
$R^3$ = H or $C_1-C_{10}$ alkyl
$X = X^1 = O$ or $NR^4$
$R^4$ = H, $C_1-C_{10}$ alkyl group, or $[(CH_2)_qX^2R^5]$
q = an integer of 2-4
$R^5$ is H, $C_1-C_{10}$ alkyl group
$X^2$ is O or NH each of X and $X^1$ may be the same or may be different and when p>1 each of the repeating units $[X(CH_2)_m]$ may be the same or may be different.

The polyisobutenyl group, PIB may be completely saturated or may have a small degree of residual unsaturation.

The carbonyl functionalised polyisobutenes may suitably be obtained by the process described in our co-pending European Application 271261 wherein there is passed through a column of the polyisobutene maintained at 140° to 200° C. and at atmospheric or elevated total pressure a molecular oxygen-containing gas at a gas flow rate greater than 10 liters $cm^{-2} h^{-1}$ measured at the operating pressure. The carbonyl functionalised polyisobutene suitably has a number average molecular weight in the range from about 600 to about 10,000 $gmol^{-1}$, and an oxygen content [O] in the range 1-10% w/w. Carbonyl functionalised polyisobutenes prepared by other methods may also be employed, for example by ozonolysis of the polyisobutenes.

The process is preferably carried out in one step or two steps, preferably one step. When the process is carried out in two steps, in the first step the carbonyl functionalised polyisobutene is reacted with the amine. The use of a solvent for this reaction is optional, the carbonyl functionalised polyisobutene may optionally be supplied as a solution. The amine is preferably an amine of the formula $H_2NR^1$ where $R^1$ has the meaning as given in formula (I) more preferably an aliphatic amine. Although it is possible to use a monoamine, i.e. $R^1$ is a $C_1-C_{20}$ alkyl group it is preferred in order to achieve suitable nitrogen levels in the product to use an aliphatic polyamine (for example tris(2-amino ethyl)amine) suitably in a mole ratio of aliphatic polyamine to carbonyl functionalised polyisobutene in the range from about 0.2 to about 2.5 moles of polyamine per mole of the carbonyl functionalised polyisobutene.

Aliphatic polyamines having the general formula:

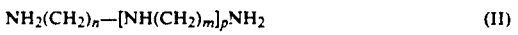

wherein n is an integer of 2 to 4 and m and p have the meaning as given in formula (I) are suitable reactants. Specific compounds falling within the aforesaid formula (II) include ethylene diamine, diethylene triamine, triethylene tetramine, tetraethylene pentamine, propylene diamine, dipropylene diamine, and the like.

Alcoholamines are also suitable amines; particular examples are N(2-amino ethyl)ethanolamine, NN-bis(2 hydroxy ethyl)ethylene diamine. Alcoholamines necessarily comprise at least one —OH group.

Etheramines are also suitable amines; an etheramine will comprise at least one oxygen ether linkage within the molecule.

In the second step of a two-step process the intermediate formed by reaction of the carbonyl functionalised polyisobutene with an amine is hydrogenated. The intermediate is an imine. Hydrogenation of the intermediate may be accomplished by catalytic hydrogenation (for example by $H_2$ using Pt on C). However, it is preferred to react the intermediate at elevated temperature and either subatmospheric, atmospheric or superatmospheric pressure with formic acid, which functions effectively as a source of hydrogen. The formic acid may be either anhydrous (by anhydrous we mean 98% w/w aqueous solution) or aqueous formic acid (for example 85% w/w) anhydrous formic acid is preferred. The amount of formic acid relative to the intermediate may suitably be in the range from 0.5:1 to 5:1, preferably from 0.5:1 to 2:1 molar ratio based on basic nitrogen in the intermediate product and based on reaction of the carbonyl functionalised polyisobutene with a diamine.

The intermediate is preferably reacted with the formic acid at a temperature in the range from 50° to 130° C. (at atmospheric pressure).

It is preferable to carry out the process in one step without isolating the intermediate imine. For example the reaction can suitably be carried out in the presence of hydrogen and hydrogenation catalyst (e.g. Pt on C), or alternative in the presence of formic acid; preferably in the presence of formic acid. A one step process would comprise reacting the carbonyl functionalised polyisobutene with an amine under conditions that would reduce the intermediate imine to the corresponding amine.

The carbonyl functionalised polyisobutene may suitably be reacted with the amine at a temperature in the range from 50° to 250° C., preferably in the range from 120° to 180° C. and at subatmospheric, atmospheric or superatomspheric pressure.

Finally, it is preferred to remove any excess formic acid, any excess amine and/or water, suitably by distillation under subatmospheric pressure.

The invention is also directed to an additive concentrate comprising a polyisobutene amine as produced by the process of the present invention and a carrier fluid either with or without additives conventionally employed in fuels.

The additive concentrate may be used for incorporation into a fuel composition.

The invention is also directed to a fuel composition comprising a major proportion of a fuel and a minor proportion of a polyisobutene amine as produced by the process of the present invention.

The fuel may suitably be an internal combustion engine fuel. A preferred fuel is one suitable for use in spark ignition engines, for example a motor gasoline. Alternatively, the fuel may be a fuel suitable for use in compression ignition engines, for example a diesel fuel.

Preferably the fuel is a motor gasoline, which may contain in addition to the polyisobutene amine other additives conventionally employed in such fuels.

The amount of polyisobutene amine employed in the motor gasoline should be at least sufficient to provide detergency properties, typically from 10 to 10,000 ppm.

The invention will now be further illustrated by reference to the following Examples and Comparison Tests.

(I) Preparation of polyisobutene amine

EXAMPLE 1

The polyisobutene oxidate referred to hereinafter was a carbonyl functionalised polyisobutene produced by the process described in Example 1 of our copending EP-A-0271261, with a number average molecular weight $Mn = 1190$ $gmol^{-1}$, and an oxygen content $[O] = 2.78\%$ w/w.

(a) First Step

A flanged flask was charged with polyisobutene oxidate (622.98 g). A multi-socket flange lid containing a stirrer, a thermowell, a condenser and a nitrogen purge inlet was then fitted. The temperature was set by means of a Eurotherm to 100° C. Stirring was begun and nitrogen purging began. As soon as a steady temperature of 100° C. was achieved, 3(dimethylamino)propylamine (99.87 g) was added. The temperature was then increased to 120° C. and the reaction mixture held at this temperature for 4 hours. At the end of the 4 hours the temperature was increased to 150° C. and full vacuum (760 mm Hg) was applied for 30 minutes. The vacuum was then released with nitrogen. Finally, the product was filtered through a sintered glass crucible containing a thin layer of Highflow filter aid. Samples were taken for analysis.

| | |
|---|---|
| Oxidate charged = | 622.98 g |
| 3(dimethylamino) propylamine = | 99.87 g |
| Product = | 585.45 g |

The product (designated Sample A) was storable in a clear nitrogen purged powder jar.

(b) Second Step

A portion of the product from (a) (250.14 g) was charged to a 500 ml flanged flask equipped with the same facilities as that used in (a) above. The temperature was set at 100° C. 98% formic acid (2.45 g) was then carefully added via a dropping funnel. The temperature was held at 100° C. for 2 hours. Vacuum was then applied and the temperature increased to 180° C. The vacuum was held at this temperature for 30 mintues. Finally, the product was filtered in the manner described in (a) above. The product is designated Sample B.

| | Results | | |
|---|---|---|---|
| Sample | TBN (mgKOH/g) | Basic N (%) | Total N (%) |
| A | 26.92 | 0.67 | 0.75 |
| B | 19.10 | 0.48 | 0.54 |

TBN was measured according to ASTM 2896, Basic Nitrogen was measured according to ASTM d664 and Total Nitrogen was measured using a Dohrman nitrogen analyser.

(II) Engine Testing

Samples A and B were separately mixed with solvent A260(1:1) and submitted for engine testing in the Opel Kadett Engine Test.

The Opel Kadett Engine test is a well-known industry accepted procedure approved by the Coordinating European Council (CEC) Reference No. C.E.C.F.-02-T-79. The formulations used and the engine test results are given in the accompanying Table. The results are presented as averages for each pair of valves.

TABLE

| FORMULATION (ppm in gasoline) | | |
|---|---|---|
| Sample A | 250 | |
| Sample B | | 250 |
| SOLVENT A260 | 250 | 250 |
| SN 500 | 400 | 400 |
| Treatment level (ppm wt) | 900 | 900 |
| ENGINE DATA | | |
| VALVE DEPOSITS (mg) | 75 | 21 |
| VALVE MERIT RATING (10 = clean) | 9.15 | 9.75 |

Sample A is not an example in accordance with the present invention because the intermediate imine product had not been hydrogenated to an amine product. It is included only for the purpose of comparison.

A260 was supplied by BP Chemicals Limited.
SN500 is an ASTM solvent neutral 500 grade oil.
"Eurotherm" and "Highflow" are Trade Marks.

Example 2 and 3 are examples of one-step processes according to the invention. The ingredients as charged were stirred under the conditions stated, the product was vacuum stripped and filtered.

EXAMPLE 2

| Charge: | 150 g polyisobutene oxidate |
| | 12 g 3(dimethylamino) propylamine |
| | 150 g cyclohexane |
| | 3 g Ni on carbon catalyst |
| Conditions: | Pressure, 20 bar $H_2$ |
| | Temp, 140° C. |
| | Duration, 5 hrs |
| Work up: | Vacuum strip at 140° C. for 0.5 hrs. |
| Analysis: | Basic Nitrogen  Total Nitrogen |
| TBN (mgKOH/g) | Calc* (% w/w)  % w/w |
| 17.95 | 0.45  0.75 |

*Calculated from the TBN

EXAMPLE 3

| Charge: | 319 g polyisobutene oxidate |
| | 15 g formic acid (98%) |
| | 100 g o-xylene |
| | 20 g 3(dimethylamino) propylamine |
| Conditions: | Pressure, atmospheric |
| | Temp, 140° C.-170° C. |
| | Duration, 4 hrs |
| Work up: | Vacuum strip at 150° C. for 0.5 hrs. |
| Analysis: | Basic Nitrogen  Total Nitrogen |
| | 0.87% w/w  1.05% w/w |

We claim:

1. A process for the preparation of a polyisobutene amine comprising reacting a carbonyl functionalised polyisobutene and an amine and hydrogenating the product of the reaction between said carbonyl functionalised polyisobutene and said amine.

2. A process as claimed in claim 1 for the preparation of a polyisobutene amine wherein the polyisobutene amine has the formula (I)

comprising reacting a carbonyl functionalised polyisobutene [PIB]—(CO)R and an amine $H_2NR^1$ and hydrogenating the product of the reaction between said carbonyl functionalised polyisobutene and said amine, where PIB is a polyisobutenyl group, R = H, methyl or vinyl,
$R^1 = C_1-C_{20}$ alkyl group or —$(CHR^2)_n[X(CH_2)_m]_pX^1R^3$
$R^2$ = H or methyl
n = an integer of 1–4
m = an integer of 2–4
p = 0, or an integer of 1–10
$R^3$ = H or $C_1-C_{10}$ alkyl
X, $X^1$ = O or $NR^4$
$R^4$ = H, $C_1-C_{10}$ alkyl group, or $[(CH_2)_qX^2R^5]$
q = an integer of 2–4
$R^5$ is H, $C_1-C_{10}$ alkyl group
$X^2$ is O or NH
each of X and $X^1$ may be the same or may be different and when p>1 each of the repeating units $[X(CH_2)_m]$ may be the same or may be different.

3. A process as claimed in claim 2 wherein the amine $H_2NR^1$ is an aliphatic polyamine.

4. A process as claimed in either claim 2 or claim 3 where $R^1$ is —$(CH_2)_n[NH(CH_2)_m]_pNH_2$ wherein n is an integer from 2 to 4 and p and m are as defined in formula I.

5. A process as claimed in claim 2 wherein the amine $H_2NR^1$ is an alcoholamine.

6. A process as claimed in claims 1 or 2 wherein the carbonyl functionalised polyisobutene [PIB]—(CO)R has a number average molecular weight in the range of 600 to about 10,000 gmol$^{-1}$ and an oxygen content [O] in the range 1–10% w/w.

7. A process as claimed in claims 1 or 2 wherein the product of the reaction between the carbonyl functionalised polyisobutene [PIB]—(CO)R and the amine is hydrogenated using formic acid.

8. A process as claimed in claims 1 or 2 wherein the process is carried out in one step.

9. A process as claimed in claim 1 or claim 2 wherein the reaction of carbonyl functionalized polyisobutene is reacted with an amine in the absence of ammonia.

* * * * *